United States Patent [19]

Fontana

[11] Patent Number: 5,678,608
[45] Date of Patent: Oct. 21, 1997

[54] ANTI-SEIZURE PROTECTION FOR JOINTS, PARTICULARLY SUITABLE FOR THE PETROLEUM SECTOR

[75] Inventor: Giulio Fontana, Sesto San Giovanni, Italy

[73] Assignee: AGIP S.p.A., Milan, Italy

[21] Appl. No.: 558,499

[22] Filed: Nov. 16, 1995

Related U.S. Application Data

[63] Continuation of Ser. No. 266,675, Jun. 28, 1994, abandoned.

[30] Foreign Application Priority Data

Jun. 30, 1993 [IT] Italy ............... MI93A1401

[51] Int. Cl.⁶ .................................... F16L 7/00
[52] U.S. Cl. ................. 138/96 T; 138/143; 138/DIG. 6; 285/55; 285/94
[58] Field of Search ................ 148/96 R, 96 T, 148/177, DIG. 6, 518, 519; 138/103, 145, 146, 109, 143; 285/55, 94, 422, 333, 334, 354, 396; 411/428, 257, 914

[56] References Cited

U.S. PATENT DOCUMENTS

| | | | |
|---|---|---|---|
| 1,646,736 | 10/1927 | Mills | 138/DIG. 6 |
| 1,839,448 | 1/1932 | Stresan | 138/96 T |
| 2,061,921 | 11/1936 | Roath | 138/DIG. 6 |
| 2,223,202 | 11/1940 | Bergam | 138/96 T |
| 2,240,021 | 4/1941 | Ratherford | 138/DIG. 6 |
| 2,854,737 | 10/1958 | Gray | |
| 4,468,309 | 8/1984 | White | 285/422 |
| 4,474,651 | 10/1984 | Yauchi et al. | 204/34 |
| 4,527,815 | 7/1985 | Frick | 285/422 |
| 4,630,849 | 12/1986 | Fukui et al. | 285/94 |
| 4,758,025 | 7/1988 | Frick | 285/422 |
| 4,871,194 | 10/1989 | Kawashima et al. | 285/94 |
| 5,253,902 | 10/1993 | Petelot et al. | 285/94 |

FOREIGN PATENT DOCUMENTS

| | | | |
|---|---|---|---|
| 0157587 | 10/1985 | European Pat. Off. | |
| 500482 | 8/1992 | European Pat. Off. | |
| 0020460 | 1/1988 | Japan | 148/518 |
| 0618428 | 8/1978 | U.S.S.R. | 148/518 |
| 2104919 | 3/1983 | United Kingdom | |

OTHER PUBLICATIONS

Database WPI 8623, Derwent Publications Ltd., London, great Britain, AN 86–146450 & JP-A-61 079 798, (Sumoto Metal Ind KK) 23 Apr. 1986.

Patent Abstracts of Japan, vol. 006, No. 224 (M-170) 9 Nov. 1982 & JP-A-57 107 593, (Sumitomo Kizoku Kouzan KK), 7 Aug. 1982, "Brazing Alloy For Adhering Of Ferrite," Kuwano Akira.

*Primary Examiner*—Patrick Brinson
*Attorney, Agent, or Firm*—Oblon, Spivak, McClelland, Maier & Neustadt, P.C.

[57] ABSTRACT

An anti-seizure protection for a threaded joint or sleeve, particularly suitable for the petroleum sector, comprises a first film layer of a copper-zinc alloy anchored to the threads of the joint and a second film layer of lead anchored to the first layer. The anchoring is preferably achieved by ionic deposition.

2 Claims, 1 Drawing Sheet

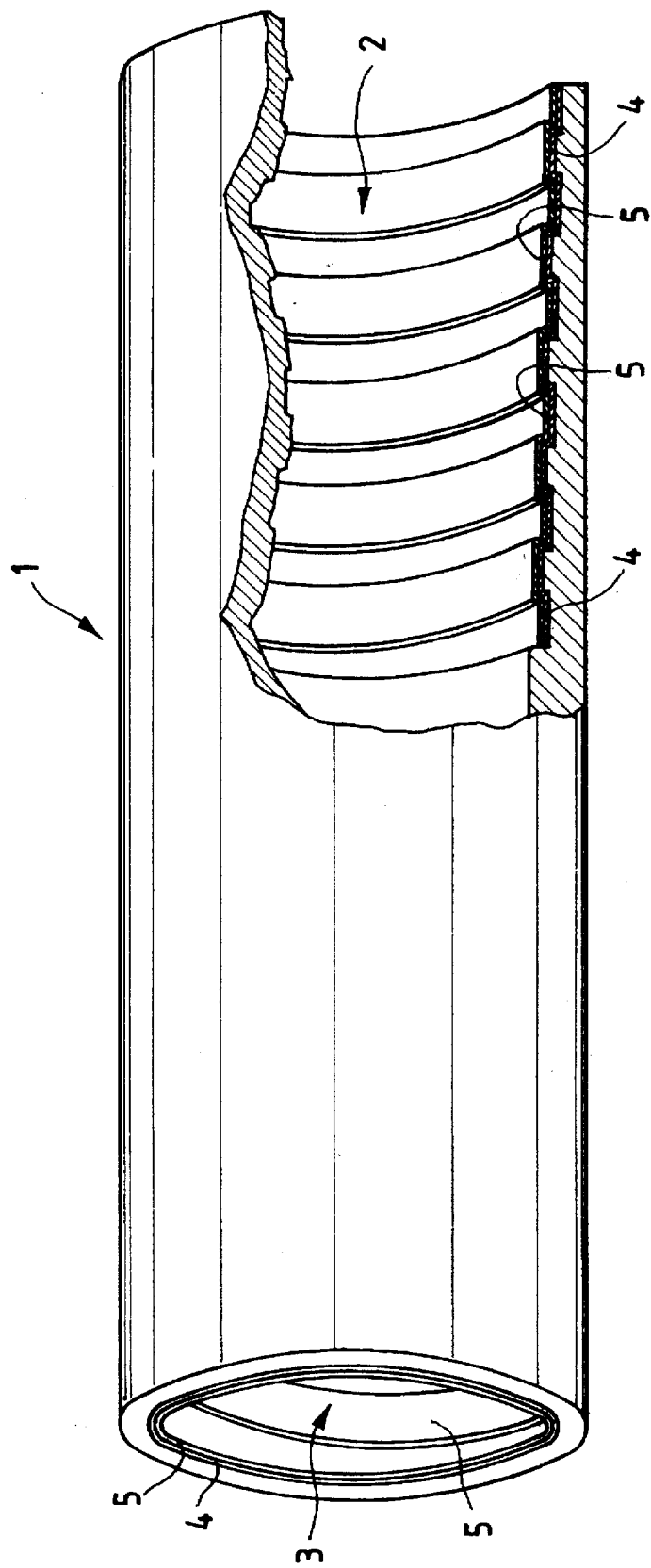

ANTI-SEIZURE PROTECTION FOR JOINTS, PARTICULARLY SUITABLE FOR THE PETROLEUM SECTOR

This application is a continuation of application Ser. No. 08/266,675, filed on Jun. 28, 1994, now abandoned.

BACKGROUND OF THE INVENTION

1. Field of the Invention

This invention relates to a new anti-seizure protection which allows effective and reliable screwing and unscrewing of a threaded joint without the use of grease containing powdered lead.

2. Discussion of the Related Art

As is well known, in the petroleum sector, high corrosion resistant pipes constructed of nickel-chromium-molybdenum (Ni—Cr—Mo) alloys are connected together at their ends by threaded joints or sleeves of the same material, cooperating with corresponding threads on the pipes to be connected together.

However because of their Ni—Cr—Mo composition, said joints or sleeves have a considerable tendency to seize.

In the state of the art, this problem is overcome by galvanically depositing copper (Cu) or ionically depositing a sliver-palladium (Ag—Pd) alloy on the threads of said joints. However in either case it is necessary to further apply a layer of grease during screwing, experimental tests having shown that this grease must necessarily contain powdered lead (Pb) to be effective.

Recent European Community and American regulations state however that for ecological, hygiene and safety reasons, the use of any grease containing lead powder is prohibited, the use of such a grease, which degrades at high operating temperatures, also inevitably leaving particulates which increase the risk of seizure during unscrewing.

SUMMARY OF THE INVENTION

The object of the present invention is to obviate said drawbacks by providing an anti-seizure protection which does not require the use of lubricants containing powdered lead.

This is substantially attained by depositing in the form of metal ions on the joint threads all those metal particles which are generally present in a grease, hence rendering superfluous the further use of a lubricant grease of the currently used type. More specifically, a two-layer anti-seizure ionic coating is applied to the threads of the joint, namely a first film layer of a zinc-copper (Zn—Cu) alloy anchored to the base material of the joint to act as a support and anchorage for a second film layer of metallic lead for purely anti-seizure purposes.

In this manner, said second layer of metallic lead provides effective lubrication with low shear resistance, ensuring screwing without the need for grease but with the simple use of synthesis oil, the effective anchorage achieved for said second layer and the very small lead quantity deposited ensuring against even minimum lead dispersion into the environment.

Hence, the anti-seizure protection for a threaded joint or tubular sleeve, particularly suitable for the petroleum sector, is characterized according to the present invention by comprising a first film layer of copper-zinc alloy anchored to the base material of the joint and a second film layer of metallic lead anchored to said first layer.

According to a preferred embodiment of the present invention, said first layer and said second layer are anchored respectively to the base material of the joint and to the first layer by ionic deposition.

BRIEF DESCRIPTION OF THE DRAWINGS

The figure represents a partly sectional perspective view of a joint or sleeve formed in accordance with the invention.

DESCRIPTION OF THE PREFERRED EMBODIMENT

The invention is described in detail hereinafter with reference to the accompanying drawing which illustrates a preferred embodiment thereof by way of non-limiting example in that technical, technological or constructional modifications can be made thereto without leaving the scope of protection of the present invention. For example, the invention can be applied not only to joints or sleeves used in the petroleum sector but also to the aerospace sector and in fact to any situation involving mutually sliding bodies.

In the figure the reference numeral 1 indicates a joint or sleeve provided with internal threads 2 and 3 arranged to cooperate with the corresponding external threads of two pipes, not shown in the figure, which are to be connected together at their ends.

To prevent possible seizure and hence ensure repeated, easy and reliable screwing and unscrewing of the joint 1 onto and from said pipes and to enable the screwing to be achieved without the need for lead-containing grease, but with the use merely of a simple synthesis oil, on said threads 2 and 3 of the joint 1 there is applied a two-layer ionic coating consisting of a first film layer 4 of Cu—Zn (copper-zinc) alloy, anchored ionically to the base material of the joint 1, and a second film layer 5 of metallic lead anchored ionically to said first layer.

I claim:

1. Anti-seizure protection for a threaded joint, which comprises a first film layer consisting essentially of a copper-zinc alloy anchored to a base material of the threads of the joint and a second film layer consisting essentially of metallic lead anchored to said first film layer;

wherein said first film layer and said second film layer are anchored by ionic deposition, respectively, to the base material of the joint and the first film layer.

2. An anti-seizure joint having threads, the joint comprising:

a first film layer consisting essentially of a copper zinc alloy anchored to the threads of the joint; and a second film layer consisting essentially of metallic lead anchored to said first film layer;

wherein the first film layer provides for a support and anchorage for the second film layer, and the second film layer provides lubrication with low shear resistance to prevent seizure between the joint and pipes which are screwed into the joint and unscrewed from the joint.

* * * * *